United States Patent [19]

Wildner

[11] Patent Number: 4,929,154
[45] Date of Patent: May 29, 1990

[54] BLADE ARRANGEMENT FOR A PROPULSION ROTOR

[75] Inventor: Walter Wildner, Munich, Fed. Rep. of Germany

[73] Assignee: MTU Motoren-und Turbinen-Union Munchen, Munich, Fed. Rep. of Germany

[21] Appl. No.: 302,327

[22] Filed: Jan. 27, 1989

[30] Foreign Application Priority Data

Jan. 30, 1988 [DE] Fed. Rep. of Germany ....... 3802774

[51] Int. Cl.⁵ .............................................. F01D 5/14
[52] U.S. Cl. ............................... 416/230; 416/229 A; 416/213 R; 416/248
[58] Field of Search ........... 416/230, 229 A R, 219 R, 416/220 R, 213 R, 204 R, 500, 248

[56] References Cited

U.S. PATENT DOCUMENTS

| | | |
|---|---|---|
| 2,868,439 | 1/1959 | Hampshire et al. ............ 416/229 A |
| 3,675,294 | 7/1972 | Palfregman et al. ........... 416/230 R |
| 3,694,104 | 9/1972 | Erwin ................................. 416/230 |
| 3,737,250 | 6/1973 | Pilpel et al. ......................... 416/248 |
| 4,339,229 | 7/1982 | Rossmann ........................... 416/230 |
| 4,464,097 | 8/1984 | Schultz ............................... 416/230 |
| 4,810,167 | 3/1989 | Spottman et al. .................. 416/230 |

FOREIGN PATENT DOCUMENTS 1628286 8/1970 Fed. Rep. of Germany .
2042665 3/1971 Fed. Rep. of Germany .

Primary Examiner—Carl D. Price
Assistant Examiner—John T. Kwon
Attorney, Agent, or Firm—Barnes & Thornburg

[57] ABSTRACT

A fiber-structured [guide] rotor blade is connected to a metallic rotor in that a supporting core, around which fiber layers are wound, and which extends over the whole blade width, has radial webs in its central section. This results in a form-locking fastening which utilizes the characteristics of the fiber materials.

12 Claims, 4 Drawing Sheets

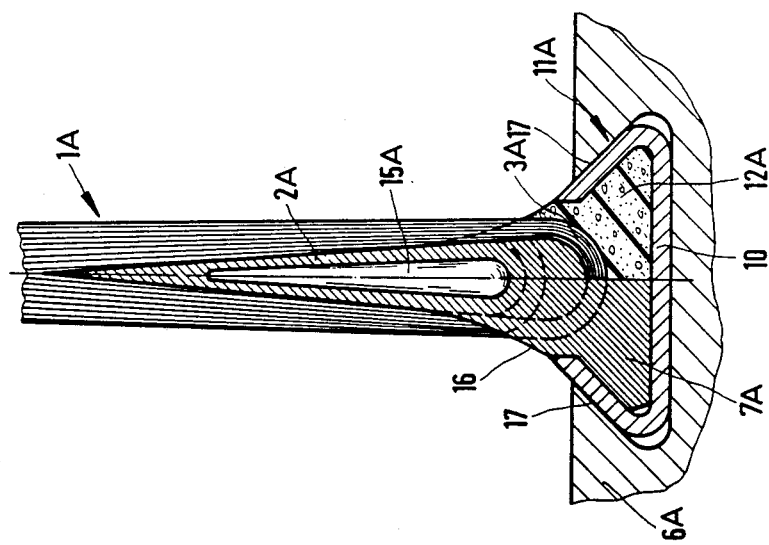
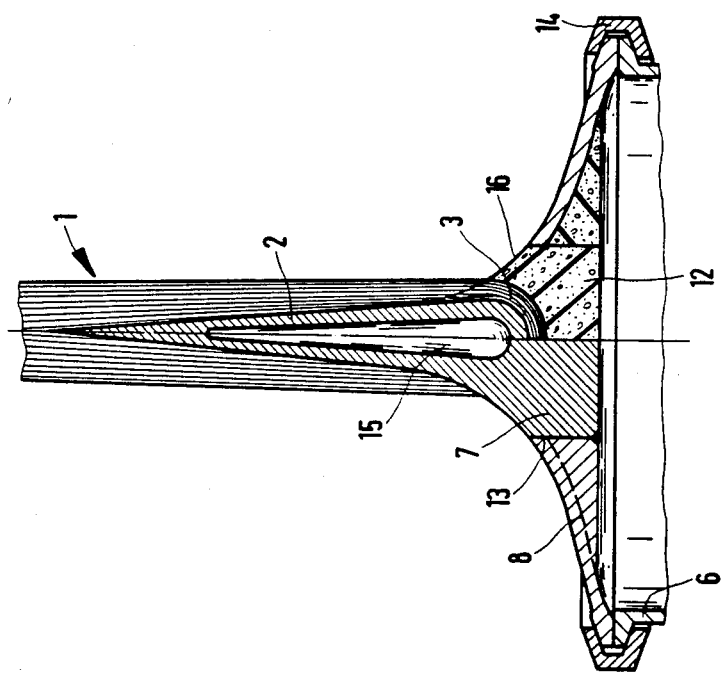

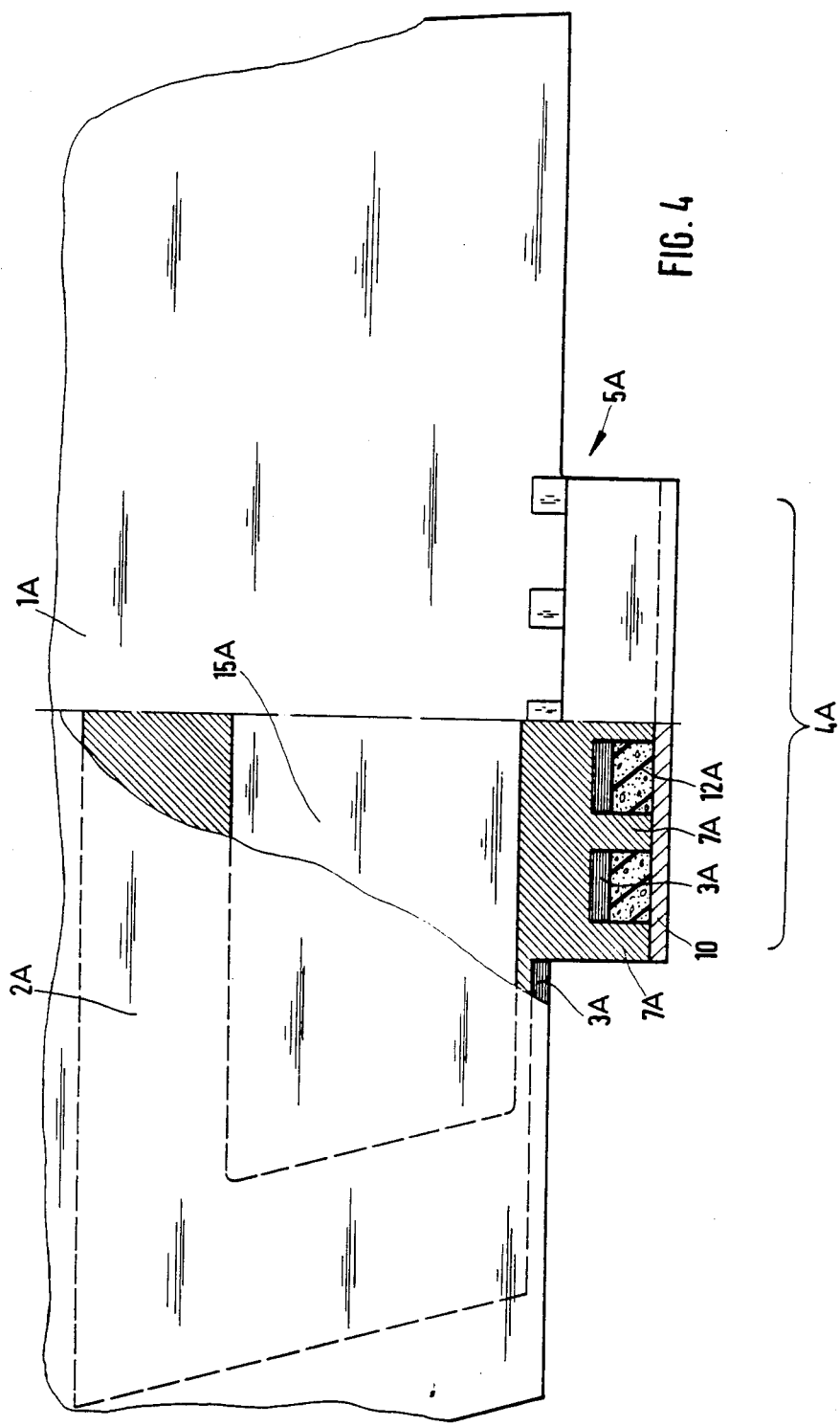

BLADE ARRANGEMENT FOR A PROPULSION ROTOR

BACKGROUND AND SUMMARY OF THE INVENTION

The invention relates to a rotor blade arrangement of the type utilizing fiber composite material.

Worldwide efforts are being made to reduce the engine weight in the construction of turbine aero engines by using fiber composites (FVW). Modern engines, particularly for commercial airplanes, have a high by-pass ratio and therefore considerable dimensions of the fan blades or prop-fan blades. These blades, which rotate at very high rotational speeds, are subject to high stress caused by centrifugal force and must therefore be manufactured of high-strength materials.

Because of their high tensile strength in combination with their low specific weight, the use of fiber composites is suggested for blades of this type. However, in this case, the introduction of forces, particularly of the centrifugal forces and of the stresses caused by foreign-object impact, from the fiber-structured blade to the metallic hub has been solved only insufficiently. In constructions known in prior art, the fiber-structured rotor blade is glued or riveted onto the metal base constructed as a blade core.

Since the shearing strength and the crushing strength of fiber composites is considerably lower than that of metals, it has not been possible to construct the blade base of fiber composites, whereby a functionally effective transfer of force from the blade to the hub would have to be ensured. For this reason, the blade is constructed of metal. However, in this case, there is the problem of a good introduction of force, because the connection is mainly constructed to be frictional and not form-locking.

A rotor blade of this type is known from German Published Unexamined Patent Application (DE-OS) No. 20 42 665, in which the fiber strands wind around an axially arranged pin and are hung into a slot of the metallic blade base. It is a disadvantage that the fibers are stressed by pressure in a relatively small section in order to absorb the centrifugal forces.

From German Published Unexamined Patent Application (DE-OS) No. 16 28 286, a blade fastening system is known for an axial fan, in which the fiber strands wind around a pin, the pin being arranged in a connecting piece. In this case, the blade can be pivoted laterally and has low bending resistance.

An object of invention is therefore to achieve a good introduction of the forces occurring during the operation from the fiber-structured blade to the metallic blade base, in which case the fiber materials are to be stressed only with respect to tension.

According to the invention, this object is achieved by providing an arrangement including:

Blade core means provided with a plurality of core webs spaced from one another and extending radially toward a rotor rotational axis when in an in use position on a rotor, fiber loops made of fiber strands wound onto the blade core means to form a blade with a portion of said fiber loops extending between said core webs to anchor said fiber loops at the blade core means, and blade core anchoring means for anchoring said blade core means to a rotor by way of said core webs and separately of the fiber loops, whereby said fiber strands are securely anchored to said rotor while being stressed only in tension in response to centrifugal forces acting on the blade during rotational operation of the rotor A most important advantage of the invention is that the fiber strands of the blade are hung in at the supporting core and as a result during the operation are stressed only with respect to tension. Consequently, the high tensile strength of the fibers can be utilized advantageously. In this case, the blade is fastened at the rotor by means of a number of webs distributed over the central section of the supporting core, the guide blade being fastened at the rotor side by means of these webs.

As a result of the arrangement according to the invention, a good transfer is possible of the centrifugal forces occurring during the operation to the rotor, without any unfavorable stress to the fibers of the guide blade—for example, with respect to pressure. In addition, a very stiff suspension of the guide blade is achieved which, at the same time, results in a low weight.

In certain preferred embodiments the supporting core has the shape of a wedge with a lobar rounded head in its cross-section, permitting a good winding-around by the fiber strands.

In certain preferred embodiments it is advantageously provided that the webs have uniform distances from one another. This results in a good load distribution.

According to a preferred further development of preferred embodiments of the invention, the webs are connected with a round blade base plate, which, by means of a ring-shaped collar, is fastened on the rotor side. As a result, a good adaptation can be achieved of the fastening device to a swivel mechanism for the blades integrated in the rotor. In this case, the connection of the webs and the blade base plate advantageously takes place by means of welding, particularly electronic beam welding. The latter has the advantage of a low heat development, whereby a previously mounted fiber material will not be damaged.

As an alternative, it is contemplated to manufacture the supporting core and the blade base plate as one piece, and to insert the fiber strands, in the central section of the supporting core, through the openings between the webs. The fiber strands in the web area, in this case, must be glued on subsequently.

In an alternative embodiment of the invention, the webs are constructed in their cross-section to be dovetailed. They are preferably surrounded by a metallic casing, whereby a dovetailed construction of the blade base is achieved, similar to the constructions known from compressor or turbine blades. This permits a blade fastening which requires little space and which avoids the risk of a blade failure as a result of material defects in the fastening device.

Other objects, advantages and novel features of the present invention will become apparent from the following detailed description of the invention when considered in conjunction with the accompanying drawings.

BRIEF DESCRIPTION OF THE DRAWINGS

FIG. 3 is a cross-sectional view taken along Line A—A of FIG. 2;

FIG. 4 is a view similar to FIG. 1 showing an alternative embodiment of the rotor blade fastening arrangement and;

FIG. 5 is a cross-sectional view similar to FIG. 3, of the embodiment according to FIG. 4.

DETAILED DESCRIPTION OF THE DRAWINGS

Figure 1:
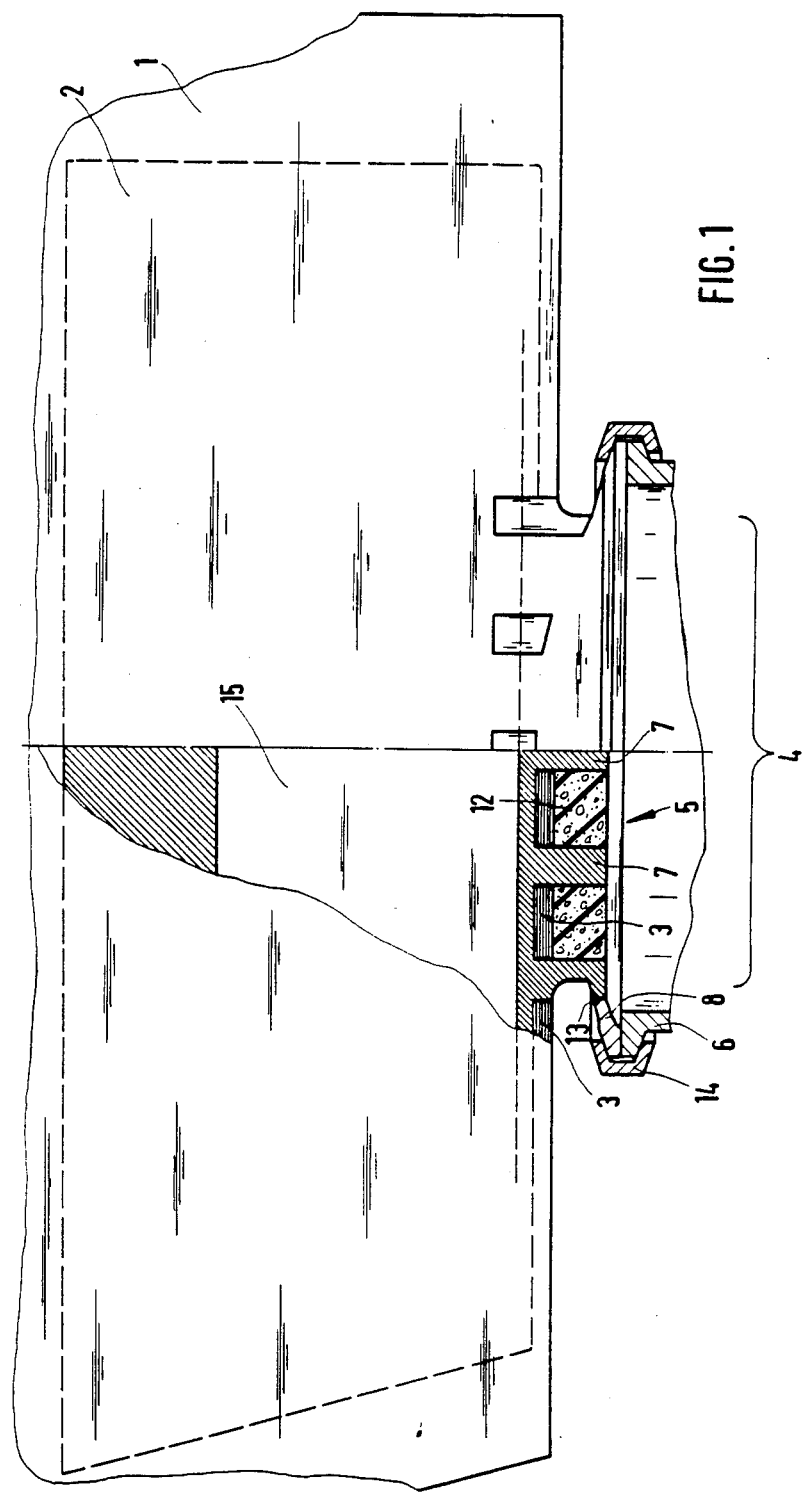
FIG. 1 is a partial sectional schematic view of the base area of a rotor blade arrangement constructed in accordance with a preferred embodiment of the invention.

FIG. 1 shows the hub-side section of a rotor blade 1 which, at least partially, consists of fiber composites. In the interior, a supporting core 2 extends essentially over the whole blade width. In the central section 4 of the hub-side end of this supporting core 2, a number of uniformly distributed webs are arranged which extend radially in the direction of the rotor. Fiber strands 3 are wound around the whole dimension of the supporting core 2. These strands may be cut open in the areas of the webs 7. An approximately round blade base plate 8 is welded onto the webs 7 along points 13. The blade base plate 8, by means of a ring-shaped collar 14, is connected with the metallic hub 6 in a form-locking manner. The hub 6 is driven by a turbo engine, which is not shown. At the circumference of the hub, a number of blades of the type of the invention are provided and are mounted by means of the fastening arrangement according to the invention. The spaces 12 between the webs 7, for forming an aerodynamically advantageous control, are filled out with a material of lower density, preferably fiber composites or foamed materials. In preferred embodiments, the filler material is carbon epoxy.

Figure 2:
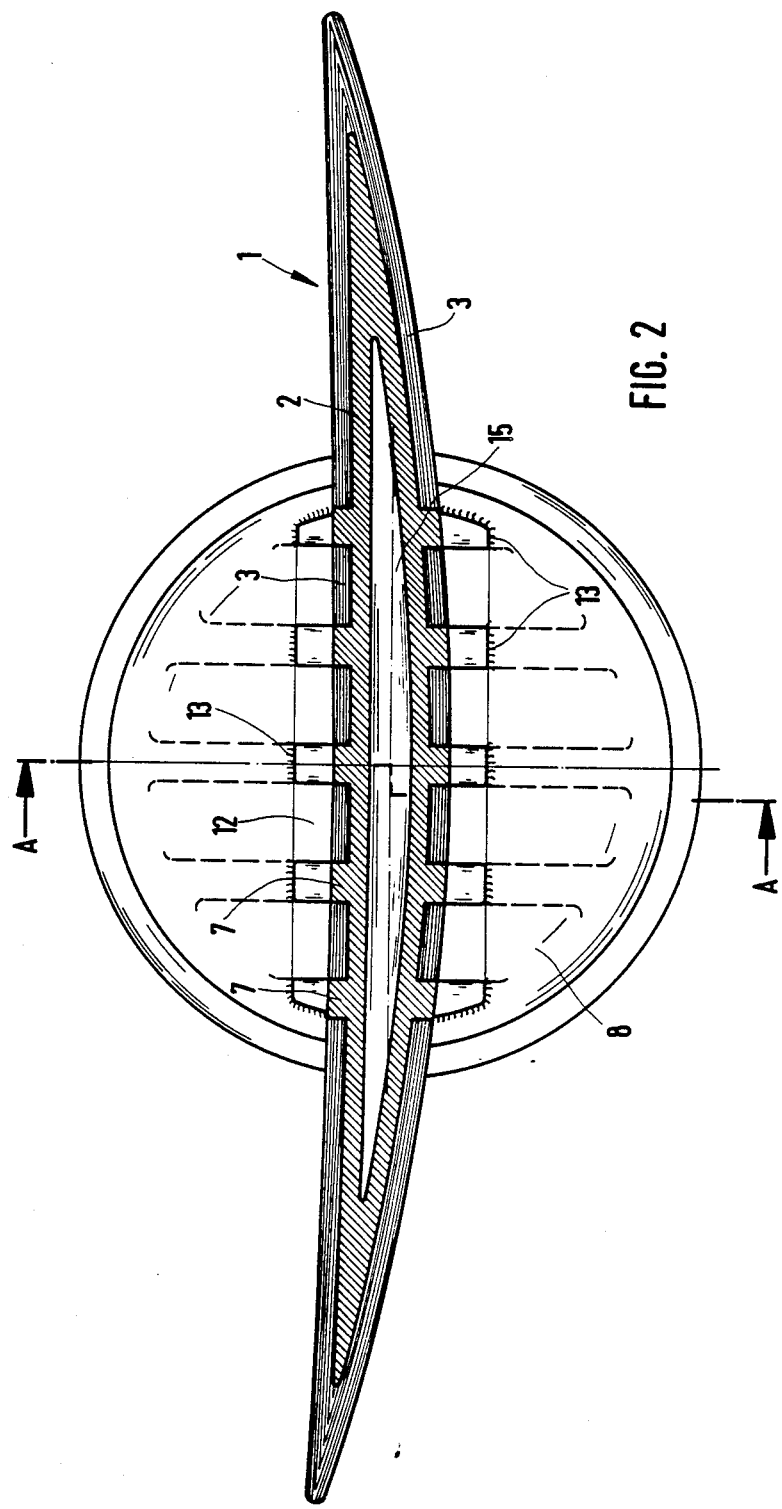
FIG. 2 is a sectional radial view of the rotor blade arrangement of FIG. 1.

FIG. 2 shows the cross-section of the blade. It is shown here that the supporting core 2 is covered by fiber strands. Only at the webs 7, no fibers are provided. In addition, points 13 are recognizable, at which the webs are connected with the blade base plate 8. In order to reduce weight, the supporting core 2 is hollow on the inside 15.

In FIG. 3, which represents a sectional view along Line A—A of FIG. 2, the drop-shaped cross-sectional contour of the supporting core 2 is shown with the interior hollow space. The spaces 12 between the webs 7 are completely filled out with a low-density material, which takes place only after the blade base plate 8 is connected with the webs 7, since these are preferably welded. Thus, particularly along the surface 16, an aerodynamically favorable shape is ensured at the guide blade base area.

FIGS. 4 and 5 show an alternative embodiment of the blade fastening. In FIGS. 4 and 5, like reference numerals as in the embodiment of FIGS. 1-3 are used for corresponding structure, with a suffix "A" added. Reference is made to the above description of corresponding parts of the embodiment of FIG. 1-3. In this embodiment, a dovetailed guiding is achieved, shown particularly in FIG. 5. In this FIG. 4 and 5 embodiment covering 10 surrounds the webs 7A thereby protecting the webs 7A and shields spaces between these webs. The support of the blade 1 during the operation is stressed by centrifugal and gas forces and takes place along the flanks 17 of the dovetailed guide 11.

In the right half of FIG. 5, a cross-section is shown in a space 12A according to FIG. 4, the space being filled with a material of low density. The left half of FIG. 5 shows a cross-sectional view of a web 7A according to FIG. 4, showing the dovetailed construction of the webs 7A. The covering 10 ensures a smooth outer contour and is also used for load distribution.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A rotor blade arrangement for a propulsion rotor of a turbojet engine or the like, comprising:
   blade core means provided with a plurality of core webs spaced from one another and extending radially toward a rotor rotational axis when in an in use position on a rotor,
   fiber loops made of fiber strands wound onto the blade core means to form a blade with a portion of said fiber loops extending between said core webs to anchor said fiber loops at the blade core means,
   and blade core anchoring means for anchoring said blade core means to a rotor by way of said core webs and separately of the fiber loops, whereby said fiber strands are securely anchored to said rotor while being stressed only in tension in response to centrifugal forces acting on the blade during rotational operation of the rotor.

2. A rotor blade arrangement according to claim 1, wherein the blade core means, in its cross-section, has the shape of a wedge with a piston-shaped rounded head.

3. A rotor blade arrangement according to claim 1, wherein the webs have uniform spaces between one another.

4. A rotor blade arrangement according to claim 1, wherein the fiber winds around the supporting core without any interruption in the spaces between the core webs, while the fiber strands in the areas of the core webs are cut open.

5. A rotor blade arrangement according to claim 1, wherein spaces between the core webs are filled with low density filler material to form a smooth aerodynamic surface with the adjacent fiber loops.

6. A rotor blade arrangement according to claim 5, wherein the filler material is carbon epoxy.

7. A rotor blade arrangement according to claim 1, wherein said anchoring means includes a blade base plate to which said core webs are directly fastened and an attaching collar for attaching the blade base plate to the rotor.

8. A rotor blade arrangement according to claim 7, wherein the webs are fastened with the blade base plate by means of welding.

9. A rotor blade arrangement according to claim 7, wherein the blade base plate is constructed to be round.

10. A rotor blade arrangement according to claim 1, wherein the core webs exhibit a dove-tailed cross section at their radially inward ends, and wherein said anchoring means includes, corresponding dove-tailed cross-section anchoring guide means at the rotor.

11. A rotor blade arrangement according to claim 10, wherein said dove-tailed cross-section of the core webs is covered by a joint covering.

12. A rotor blade arrangement according to claim 11, wherein the covering is metallic.

* * * * *